Figure 1:
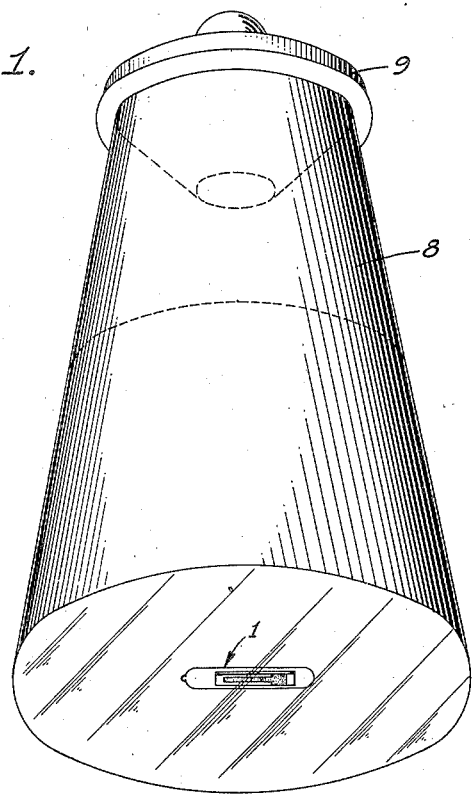

Nov. 19, 1940.  A. L. CHANEY ET AL  2,222,067
STERILIZING INDICATOR
Filed April 22, 1939

ALBERT L. CHANEY
WALTER R. LAMMERSEN
INVENTORS.

BY Harold W. Mattingly

ATTORNEY.

Patented Nov. 19, 1940

2,222,067

UNITED STATES PATENT OFFICE 2,222,067

STERILIZING INDICATOR

Albert L. Chaney, Glendale, and Walter R. Lammersen, Los Angeles, Calif., assignors to Phoebus Berman and Joe Crail, Jr., as joint trustees Application April 22, 1939, Serial No. 269,390

4 Claims. (Cl. 116—114)

Our invention relates to an indicator for critical temperatures and has particular reference to a color change type of indicator adapted to be immersed in solutions or fluid mixtures, and which finds particular utility when employed as a sterilizing indicator to indicate that the temperature of solutions or fluid mixtures has been raised to a sterilizing value.

Sterilizing indicators have been employed in the past for use with bundles and dry materials, such as dressings and bandages which are subjected to heat sterilization processes for verifying that such materials have been subjected to the required temperature-time conditions to insure sterilization of the contents of the bundle. These indicators are, in general, constructed along well known lines, an example of which is the indicator described in the Berman, et al. Patent No. 2,118,144. Indicators of this type comprise a small card of porous material upon which is placed, by a printing, stencilling or embossing process, a thin layer of thermo-sympathetic chemical or mixture of chemicals which permanently changes color whenever it is subjected to sterilizing temperatures for a sufficient time to cause sterilization of the package with which it is associated.

While these indicators are eminently satisfactory for use with dry materials, they are totally unsatisfactory for use with solutions or liquid mixtures because if they are inserted in the solution, chemical contamination of the solution occurs due to the solubility of the inks in many therapeutic solutions. If an attempt is made to associate the indicator with the solution by attaching it to the outside of the flask, vial, bottle, or container, proper results are not achieved since the temperature to which the indicator is subjected is no indication whatever of the temperature to which the contained fluid is subjected. Furthermore, indicators secured to the outside of containers are very liable to become lost so that the value of such indication is also lost.

It is therefore an object of our invention to provide an indicator for critical temperatures which may be immersed in liquids to be heat-sterilized and to remain in such liquid during the sterilizing process without contaminating such solutions.

It is also an object of our invention to provide a sterilizing indicator of the chemical color change type which is enclosed in a liquid-tight enclosure adapted to be immersed in a therapeutic fluid.

It is a further object of our invention to provide a sterilizing indicator of the character set forth in the preceding paragraphs which employs a transparent liquid-tight enclosure for the indicator so that the indications provided by the indicator may be easily observed without removing the indicator from its enclosure.

It is a further object of our invention to provide a sterilizing indicator of the character set forth in the preceding paragraphs which employs a transparent enclosure for the indicator and which is filled with a thermally conductive medium.

It is also an object of our invention to provide an indicator of the character set forth in the preceding paragraphs which may be readily and inexpensively manufactured so that it may be universally used at low cost.

Figure 2:
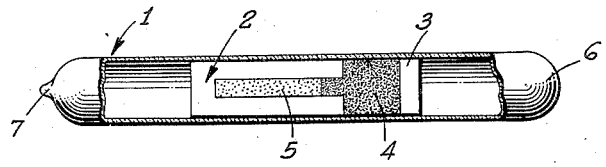

Other objects and advantages of our invention will be apparent from a study of the following specifications, read in connection with the accompanying drawing, wherein:

Fig. 1 is a perspective view illustrating the sterilizing indicator of our invention in use within a flask containing a therapeutic liquid; and Fig. 2 is a view of the indicator with parts broken away to show the construction.

Referring to the drawing, we have illustrated in Fig. 2 the preferred embodiment of our invention as including a hermetically sealed, liquid-tight, transparent enclosure 1 within which is contained a sterilizing indicator 2. The sterilizing indicator 2 may be of a well known type and constructed along the lines described in the aforementioned patent to Berman, et al. The sterilizing indicator 2 accordingly includes a base member 3, preferably of moisture absorbent material such as cardboard, blotting paper, or the like, upon which is placed, by any suitable process such as printing, stencilling, or embossing, a surface coating 4—5 of a thermo-sympathetic chemical or chemical mixture.

The part 4 of this coating is compounded in such a manner as to permanently change color when it has been subjected to temperatures required to kill most bacteria within the liquid with which it is to be used, for example, approximately 230 degrees Fahrenheit, while the other portion 5 of the coating is differently compounded so as to undergo the permanent color change when it is subjected to a temperature in excess of 230 degrees Fahrenheit which may be required to kill other, more resistant bacteria.

We prefer to make the transparent enclosure 1 for the sterilizing indicator 2 of glass since this material is particularly suitable for this use. A short section of glass tubing may have one of its ends 6 sealed in any well known manner and the sterilizing indicator 2 inserted from the other open end, after which said open end may be also sealed as indicated at 7 in Fig. 2.

It has been found that greater accuracy and better control of the temperature at which the thermo-sympathetic coatings 4—5 undergo their permanent color change is obtained if the chemical mixtures used involve water in the characteristic reaction which causes these inks to change color. When such chemicals are employed in indicators for bundles of clothing, bandages and the like, water for this reaction is readily supplied by the sterilizing steam bath in which the bundles are inserted. However, with the indicator 2 sealed in the liquid-tight envelope 1, it is impossible for the moist atmosphere of the sterilizer to have access to the thermo-sympathetic coatings and it is necessary that the water for this reaction be included within the envelope 1. Water may be introduced within the container 1 before sealing in a number of different ways. For example, water may be carried in the absorbent card portion 3 of the indicator or it may be merely added as one or two drops of water within the container at the time the sterilizing indicator is placed therein.

It has also been found that a crystal of any chemical compound which does not react with the chemicals of the coatings and which has one or more molecules of water of crystallization may also be used to supply this moisture since the water of crystallization is driven off from a crystal of this type as the temperature is raised.

In use, the solution to be sterilized may be placed in a suitable container or flask 8 and one of the sterilizing indicators in its transparent, liquid-tight envelope 1 placed also within the flask 8. The flask then may be stoppered or sealed with any suitable closure 9 and placed in a conventional sterilizer. As soon as the solution contained by the flask 8 has been heated to sterilizing temperatures, the heat thereof will be conducted through the walls of the envelope 1 and by virtue of the moisture saturated air within the envelope to the thermo-sympathetic coatings 4—5, causing them to change color. The fact that the fluid has been sterilized may then be readily ascertained by merely looking through the transparent sides of the flask 8 and observing the characteristically changed color of the sterilizing indicator 2.

We prefer to make the volume displaced by the envelope 1 sufficiently small to permit it to sink to the bottom of any therapeutic solutions in which it may be placed, so that even though such solutions may be dense or even opaque, the indicator may be observed due to its position on the bottom of the transparent flask 8.

It has been found that the envelope 1 should be constructed of a non-corrosive or non-soluble glass since ordinary silica glass is sufficiently soluble in a number of therapeutic solutions to cause contamination of these solutions. Non-corrosive glass is commercially available from a number of sources, one well known type being that sold under the trade name of "Pyrex".

From the foregoing it will be apparent that we have provided a sterilizing indicator making use of the old and tried principle of thermo-sympathetic chemical mixtures and which is peculiarly suited to use for indicating the degree of sterilization of therapeutic solutions and liquid mixtures.

It will also be observed that the materials employed in the manufacture of these devices are very inexpensive and the device itself of an extremely small size so that they may be made and sold very cheaply and universally used at very slight expense.

While we have shown and described the preferred embodiment of our invention, we do not desire to be limited to any of the details of construction shown or described herein, except as defined in the appended claims.

We claim:

1. In a sterilizing indicator for use with liquids, the combination of: a transparent liquid-tight envelope; a thermally responsive indicator in said envelope comprising a mixture of substantially dry chemicals which inter-react to provide a compound of a different characteristic color when heated to a critical temperature in the presence of water vapor; and a sufficient quantity of water enclosed within said envelope to be converted into vapor sufficient to insure the completion of said reaction when said indicator approaches said critical temperature.

2. In a sterilizing indicator for use with liquids, the combination of: a transparent liquid-tight envelope; a thermally responsive indicator in said envelope comprising a mixture of substantially dry chemicals which inter-react to provide a compound of a different characteristic color when heated to a critical temperature higher than the boiling point of water in the presence of water vapor; and water in sufficient quantity in said envelope for supplying the necessary vapor for said inter-reaction upon heating said envelope to above the boiling point of said water.

3. In a sterilizing inicator for use with liquids, the combination of: a transparent liquid-tight envelope; an absorbent card in said envelop; a substantially dry thermo-sympathetic deposit on said card compounded to undergo a permanent color change when heated to a critical temperature higher than the boiling point of water in the presence of water vapor; and water in sufficient quantity absorbed in said card for supplying the necessary vapor for said change upon heating of said card to above the boiling point of said water.

4. In a sterilizing indicator for use with liquids, the combination of: a transparent, liquid-tight envelope; a thermally responsive indicator in said envelope comprising a mixture of chemicals which inter-react to provide a compound of a different characteristic color when heated to a critical temperature in the presence of water; and a crystal of a chemical having a high water of crystallization in said envelope.

ALBERT L. CHANEY.
WALTER R. LAMMERSEN.